United States Patent [19]

Nakamuta

[11] Patent Number: 4,550,347

[45] Date of Patent: Oct. 29, 1985

[54] METHOD FOR RECORDING INFORMATION ON A RECORDING DISC

[75] Inventor: Shozo Nakamuta, Tokorozawa, Japan

[73] Assignee: Pioneer Video Corporation, Yamanashi, Japan

[21] Appl. No.: 482,725

[22] Filed: Apr. 7, 1983

[30] Foreign Application Priority Data

Apr. 7, 1982 [JP] Japan ................................ 57-057782

[51] Int. Cl.⁴ ............................................. H04N 5/76
[52] U.S. Cl. .................................... 358/338; 358/342; 369/50; 369/111
[58] Field of Search ................. 358/342, 338; 369/50, 369/111, 33, 32, 30, 275; 360/73

[56] References Cited

U.S. PATENT DOCUMENTS

| 3,829,610 | 8/1974 | Meeussen et al. | 358/342 |
| 4,190,860 | 2/1980 | Somers et al. | 369/50 |
| 4,223,349 | 9/1980 | Dakin et al. | 369/50 |
| 4,228,326 | 10/1980 | Dakin et al. | 369/50 |
| 4,514,771 | 4/1985 | Stark et al. | 360/73 |

FOREIGN PATENT DOCUMENTS 2046979 11/1980 United Kingdom .................. 360/73

OTHER PUBLICATIONS

Herald et al., "Zone Recording Flexible Diskette Drive Via Microprocessor Control", IBM Tech. Disc. Bul., vol. 23, No. 11, Apr. 1981, pp. 5068-5069.

Primary Examiner—Donald McElheny, Jr.
Attorney, Agent, or Firm—Fleit, Jacobson, Cohn & Price

[57] ABSTRACT

In order to eliminate crosstalk and to provide a high recording density, a method for recording information on a recording disc includes a first step for forming a first portion of recording tracks in which the information signal is recorded on the recording disc under a condition that the angular velocity of rotation of the disc is constant and a space between each track has a first constant value. A second step in values forming a second portion of recording tracks in which the information signal is recorded on the recording disc under a condition that the angular velocity of rotation of the recording disc is varying and the space between each track has a second constant value that is greater than the first constant value. The first and the second portions of the recording tracks are formed alternately.

14 Claims, 8 Drawing Figures

METHOD FOR RECORDING INFORMATION ON A RECORDING DISC

BACKGROUND OF THE INVENTION

1. Field of the Invention

The present invention relates to a method for recording an information signal on a recording disc, and more specifically to a recording method in which an information signal including a synchronizing signal is recorded along a concentric or a spiral track formed on the recording disc.

2. Description of Background Information

A video disc is used for recording an FM modulation signal of an information signal including a synchronizing signal, such as a video signal. The recording methods for recording the video disc are classified as a constant angular velocity (CAV) method and as a constant linear velocity (CLV) method.

In the case of a disc recorded by the CAV method, that is a CAV disc, the positions of the portions of the recording tracks in which the synchronizing signal is recorded are aligned on the same radius of the disc. Therefore there is an advantage in that the crosstalk phenomenon (a disturbance of the reproduction of the recorded signal because of a synchronizing signal of an adjacent recording track) is eliminated. However, this type of disc is not suited for long recording times since the density of recording is relatively low due to the reason that sections of the recording tracks in the outer part of the disc tend to be by far longer than the length which is required to record a piece of video signal. This is caused by the necessity of securing a minimum length of the section of recording track between horizontal synchronizing signals, i.e., a piece of video signal in the inner part of the video disc.

In the case of a disc recorded by the CLV method, that is a CLV disc, on the other hand, the density of recording is relatively high because the length of the section of recording track between horizontal synchronizing signals is made constant throughout the recording tracks. However, there is a disadvantage in that crosstalk cannot be eliminated because the positions of the recording tracks in which the horizontal synchronizing signals are recorded are not aligned on the same radius of the disc. Therefore, a signal detected by a pickup means has a beat component corresponding to the difference of the frequency of the video signal and the frequency of a horizontal synchronizing signal. And consequently, a picture reproduced on a display device is deteriorated by the beat component. Thus, the CLV disc has the disadvantage of crosstalk in spite of the advantage of the high recording density.

In order to eliminate the above-mentioned drawbacks of the CAV disc and the CLV disc, an improved recording method has been developed by the present applicant in which there is provided on a single disc, a first portion of recording tracks for recording signals by rotating a disc at a constant angular velocity, and a second portion of recording tracks for recording signals while varying the angular velocity. The basic technique is disclosed in U.S. patent application Ser. No. 446,657, filed Dec. 3, 1982.

SUMMARY OF THE INVENTION

The present invention is based on the technique described in the above identified patent application, and an object of the present invention is to provide a method for recording information on a recording disc in which a high recording density is enabled without deteriorating the crosstalk characteristics, thereby providing a longer recording time and providing an improved reproduction picture which is free from beat disturbances due to the crosstalk phenomenon.

According to the present invention, a method for recording an information signal on a recording disc comprises a first step for forming a first portion of recording tracks in which the information signal is recorded on the recording disc under a condition that the angular velocity of rotation of the disc is constant and the space between each track has a first constant value, and a second step for forming a second portion of recording tracks in which the information signal is recorded on the recording disc under a condition that the angular velocity of rotation of the recording disc is varying and the space between each track has a second constant value greater than the first constant value, wherein the first and second portions of the recording tracks are formed alternately.

BRIEF DESCRIPTION OF THE DRAWINGS

The foregoing and other objects and advantages of the present invention will become more clearly understood upon review of the following description taken in conjunction with the accompanying drawings in which.

DETAILED DESCRIPTION OF A PREFERRED EMBODIMENT

Figure 1:
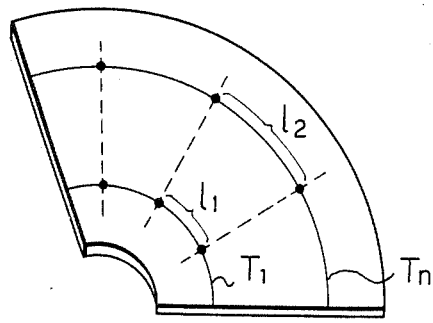
FIG. 1 is a view showing a method of recording an information signal on a conventional CAV disc.
Figure 2:
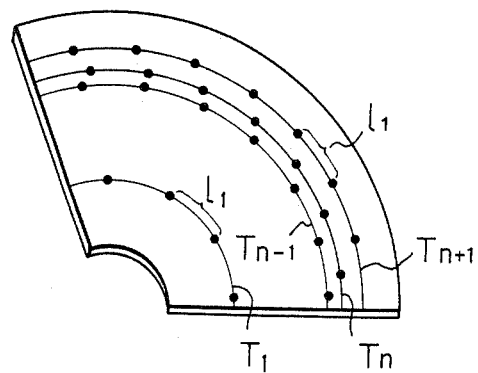
FIG. 2 is a view showing a method of recording an information signal on conventional CLV disc.

Before entering into the explanation of an embodiment of the present invention, reference is first made to FIGS. 1 and 2 in which the respective methods of recording an information signal on the conventional CAV and CLV disc are illustrated.

As illustrated in FIG. 1, positions (shown by dots) of recording tracks (T1 through Tn) on which the synchronizing signal is recorded are aligned on common radii of the recording disc. However in the case of the CAV disc, as mentioned before, there is a drawback in that the length $l_2$ of the section between the positions for the synchronizing signal tends to be unnecessarily long in the outer recording tracks Tn because of the necessity of keeping a minimum length $l_1$ between each of the synchronizing signals in the inner recording tracks.

In the case of the CLV disc, as shown in FIG. 2, the length $l_1$ of the section of the recording track between adjacent positions for synchronizing signals is made constant, and therefore the density of the recording is higher than that of the CAV disc. However, as mentioned before, in the case of the CLV disc, it is difficult to prevent the crosstalk phenomenon since the synchronizing signals, recorded at the positions illustrated by the dots in FIG. 2, is mixed with the signals reproduced from adjacent recording tracks in which the other video signal component is recorded. Thus, the picture obtained from such a video signal is subjected to a beat disturbance due to the frequency difference between the synchronizing signal and the video signal. Such a crosstalk component tends to be greater when the distance between adjacent recording tracks, i.e. the track pitch, is smaller. This is because the size of the readout light beam applied to the surface of the recording disc, or the size of the electrode in the case of the electrostatic-type disc, is relatively large as compared with the magnitude of the recording track pitch.

Therefore, an improved recording method which can eliminate the crosstalk phenomenon, as well as enable a high density recording, has been required.

Figure 3:
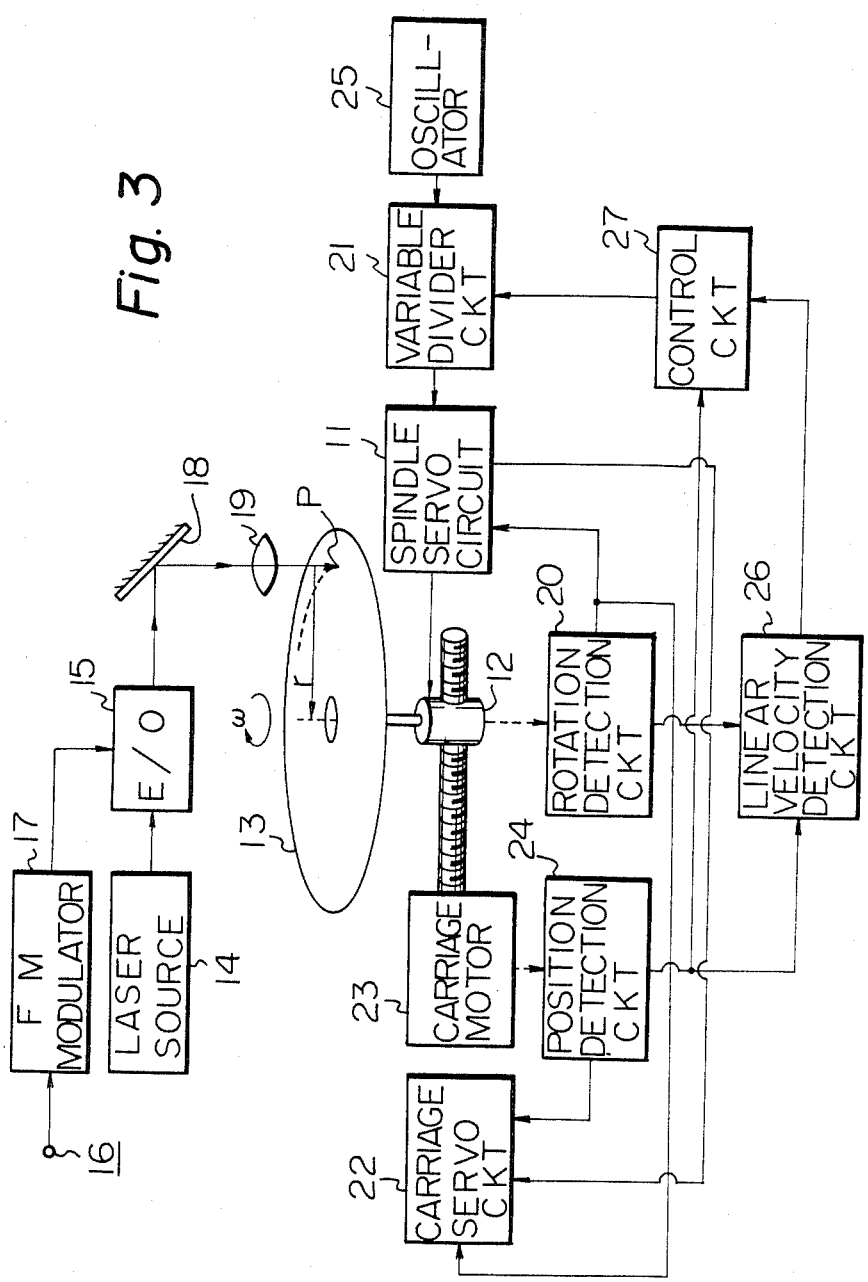
FIG. 3 is a block diagram of a recording system for the recording method according to the present invention.

Turning to FIG. 3, an example of a recording system for the recording method according to the present invention will be explained.

As shown, this system takes the form of an optical recording system and comprises a spindle motor 12 for rotating a recording disc 13, which is controlled by an output signal of a spindle servo circuit 11. The surface of the recording disc 13 is covered by a photosensitive layer made of a photo-resist material, for example, and adapted to be exposed to a light beam from a laser source 14.

The light beam from the laser source 14 is controlled on and off by means of an electro-optical (E/O) converter 15 in accordance with an output signal of an FM modulator 17 which receives an information signal at an input terminal 16 thereof. The thus on/off modulated laser beam is then focussed on the surface of the recording disc via a fixed mirror 18 and a focus lens 19.

The rotation of the recording disc 13 is detected by a rotation detection circuit 20, which comprises a rotary encoder for example, and the control signal of the spindle motor 12 is produced in the spindle servo circuit 11 by comparing the frequency and the phase of an output signal of the rotation detection circuit 20 with those of an output signal of a variable divider circuit 21 which will be described later.

In order to determine the position of the recording disc 13 relative to the position of the recording laser beam through the focus lens, a carriage motor 23, which is controlled by a carriage servo circuit 22, is provided to move the spindle motor 12 along an axis in the radial direction of the recording disc 13. The relative position of the recording disc 13 is detected by a position detection circuit 24 which comprises a linear encoder, for example. An output signal of the position detection circuit 24 is fed back to the carriage servo circuit 22 and is also applied to a linear velocity detection circuit 26 and a control circuit 27 which will be explained later. The servo circuit 22 also receives an output signal of the rotation detection circuit so that the speed of the carriage motor 23 is controlled to form the recording tracks having a proper pitch in accordance with the rotation of the recording disc 13.

In the spindle servo circuit 11, a control signal for the spindle motor 12 is produced by comparing the frequency and the phase of the output signal of the rotation detection circuit 20 with those of a signal from an oscillation circuit 25 divided by a variable divider circuit 21 comprising a variable counter, for example, at a predetermined dividing ratio. The dividing ratio n is varied in accordance with a control circuit 27 which receives a linear velocity signal produced in the linear velocity detection circuit 26 from output signals of the position detection circuit 24 and the rotation detection circuit 20.

More specifically, in the linear velocity detection circuit, a linear velocity $v$ is calculated from an angular velocity $\omega$ of the rotation of the recording disc detection by the rotation detection circuit 20 and a distance $\gamma$ from the center of rotation of the recording disc 13 to point P of the recording in accordance with an equation $v = \gamma\omega$. Then the dividing ratio n is gradually varied so that the linear velocity $v$ is in a predetermined range. Furthermore, an output signal of the position detection circuit 24 is also applied to the control circuit 27 since the dividing ratio n is varied only when the recording disc is moved in preferred positions of the range of the linear movement of the recording disc 13. A lock detection signal from the spindle servo circuit 11 is also applied to the carriage servo circuit 22.

Figures 4A, 4B, 4C, 4D:
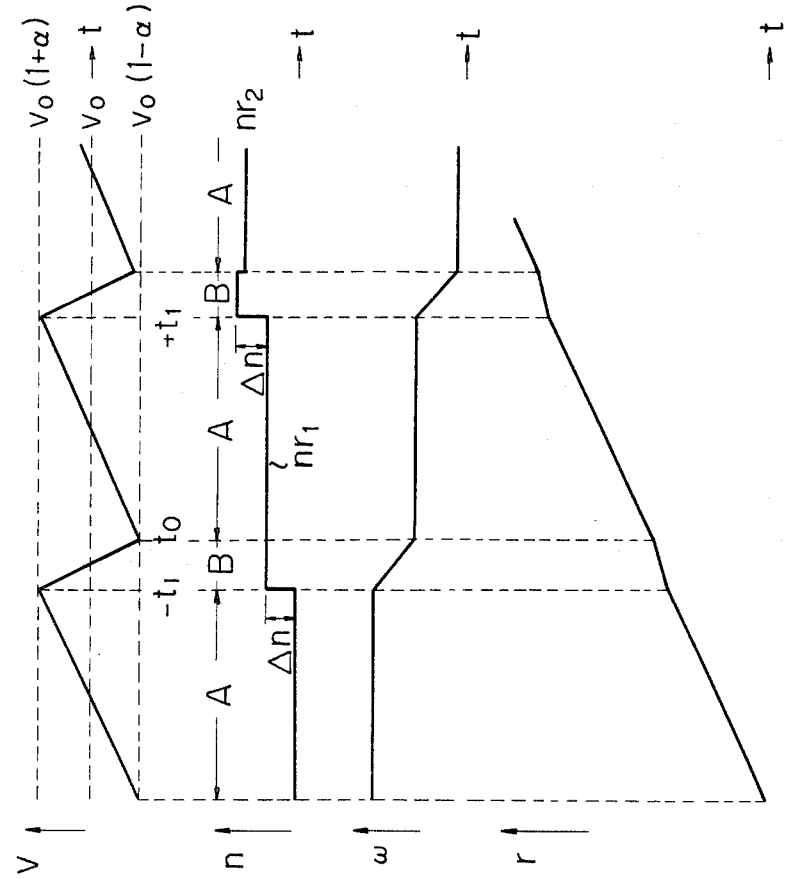
FIG. 4, consisting of 4A-4D, is a timing chart showing the operation of the recording system shown in FIG. 3.

The operation of the system shown in FIG. 3 will be explained with reference to FIGS. 4A through 4D. FIG. 4A shows the variation of linear velocity $v$ of the recording track when the recording is executed from the inner side of the recording disc to the outer side of the recording disc. FIG. 4B shows the variation of the dividing ratio of the dividing circuit 21. FIG. 4C shows the angular velocity of the recording disc. FIG. 4D shows the distance $\gamma$ of the recording point from the center of the recording disc 13. As shown, the dividing ratio n is maintained constant in a first portion A of the recording tracks and the angular velocity of the rotation of the disc is maintained constant. Thus, the recording disc is rotated so as to perform the constant angular velocity (CAV) operation. In this state, the lock detection signal from the spindle servo circuit 11 has a polarity representing the locking state. During this period, the carriage motor 23 is driven in accordance with the rotation of the spindle motor 12 in a manner that the linear velocity increases with an increase of the distance. Furthermore, in this state, the pitch of the recording tracks is maintained relatively small.

When the linear velocity reaches a predetermined maximum value $v_0(1+\alpha)$, the control circuit 27 controls the dividing circuit 21 to increase the dividing ratio n to a value $n+\Delta n$ ($\alpha$ being a positive value). In accordance with this operation, the frequency of the output signal of the dividing circuit 21 is decreased, and the spindle servo circuit 11 is set in an unlocked state.

In this unlocked state, as shown by a portion B of FIGS. 4A through 4D, the spindle servo circuit reduces the angular velocity of rotation of the recording disc in accordance with predetermined characteristics, such as a constant angular acceleration (CAA) operation in which the ratio of decreasing angular velocity is constant.

In order to realize the constant angular acceleration operation, a signal may, for example, be produced in the spindle servo circuit 11 which causes a braking effect on the drive signal of the spindle motor 12 to reduce the speed of the spindle motor 12. Otherwise, a so called free running operation of the open state of the spindle servo system may be used to decrease the speed of the spindle motor 12.

The driving operation of the portion B is not limited to the CAA operation and any kind of operation may be used in which the linear velocity of the recording track is decreased in a manner as shown in FIG. 4A. In this state, the lock detection signal from the spindle servo circuit 11 has a polarity corresponding to the unlocked state and the pitch of the recording track is maintained relatively large in accordance with the operation of the carriage motor 23.

When the rotation speed decreases to a predetermined minimum value $v_0(1-\alpha)$, the driving operation is switched again to the CAV operation. Since the position of the recording tracks in which the synchronizing signal is recorded must be aligned on the same radial direction of the disc so as to reduce the crosstalk effect, the position for effecting this switching operation to the CAV operation is limited to predetermined appropriate radial positions of the disc 13.

In other words, in order to align the positions for recording the synchronizing signal, the radius $\gamma$ of the recording track at which the recording operation is to be switched to the CAV operation has to be a value which satisfies the following equation:

$$v_n = mS/2\pi \tag{1}$$

in which S is a length t of recording track corresponding to the interval of the horizontal synchronizing signal, and m is a integral number.

This is because the circumferential length t of recording track must be a multiple of the length S of recording track corresponding to the interval of the horizontal synchronizing signals.

Assuming that the positions at which the synchronizing signals are recorded are aligned in the radial direction of the disc on the innermost recording track and the recording tracks adjacent thereto, the length S is given as follows:

$$S = 2\pi r_0 \cdot f_1 / f_2 \tag{2}$$

ps in which $r_0$ is the radius of the innermost recording track, $f_1$ is the frequency of rotation of the disc at that point, 30 Hz for example, and $f_2$ is the frequency of the synchronizing signal, 15.75 KHz for example.

Therefore, the radius $r_n$ at which the recording speed control is switched to the CAV operation is calculated from the equations (1) and (2), as follows:

$$r_n = mr_0 \cdot f_1 / f_2 \tag{3}$$

This value of $r_n$ is previously memorized or calculated in the control circuit 27, and the switching to the CAV operation is effected when the linear velocity becomes close to the value of $v_0(1-\alpha)$ and the radius of r of the recording track satisfies the equation (3). At this moment, the control circuit 27 produces a control signal which sets the dividing ratio n to a value ($n_r$) corresponding to the radial position $r_n$ calculated by the equation (3). The spindle servo system therefore operates so that it is locked to the output signal of the dividing circuit 21 and the disc is rotated at a constant angular velocity.

The control circuit 27 comprises a microprocessor having a memory device, for example.

Figure 5:
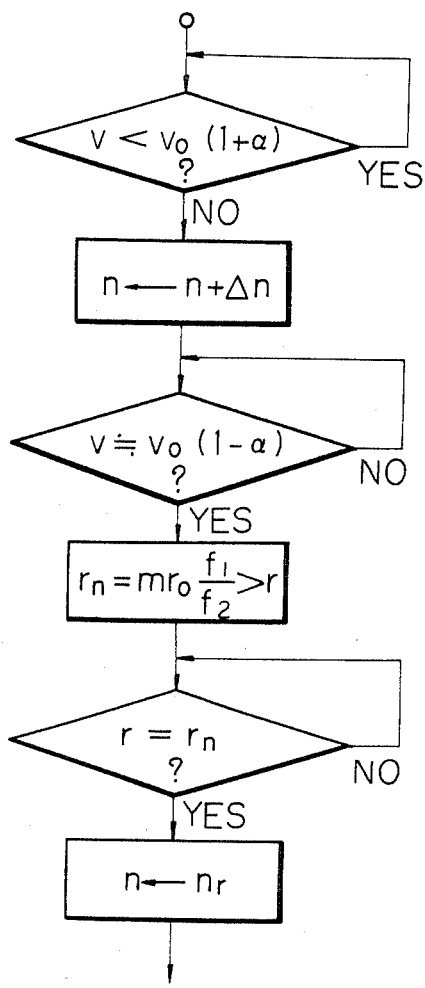
FIG. 5 is a flow chart showing the operation of the recording system shown in FIG. 3.

Referring to FIG. 5, the operational process in the control circuit 27 will be explained. As shown, the control circuit 27 monitors the linear velocity of the recording by means of the output signal of a linear velocity detection circuit. The circuit 27 does not operate until the linear velocity reaches the upper limit $v_0(1+\alpha)$. When the linear velocity $v$ reaches the upper limit $v_0(1+\alpha)$, the dividing ratio n of the dividing circuit 21 is raised by the amount $\Delta n$. With this change of the output signal of the dividing circuit 21, the spindle servo circuit 11, which receives this output signal as a basic signal thereof, is controlled to be out of the locked state thereof. Accordingly, the speed of the spindle motor reduces in accordance with the characteristic determined by the spindle servo circuit 11. This reduction of the speed of the spindle motor 12 is detected as a decrease of the linear velocity $v$.

On the other hand, when the linear velocity becomes close to the value $v_0(1-\alpha)$, which has a predetermined range, the control circuit 27 calculates the value of the radius $r_n$, which is memorized in the memory device, and is closest to the radius value of that time. When the actual radius reaches this value, the control circuit 27 sets the dividing ratio of the dividing circuit 21 to predetermined values $n_r$ ($n_{r1}$, $n_{r2}$, and so on). Thus, the positions of the recording tracks in which the synchronizing signal is recorded are aligned on the same radial directions of the recording disc between adjacent recording tracks around the radius of $r_n$.

In addition, in FIG. 4B, the dividing ratio before and after the time $t_0$ has a constant value $n + \Delta n = n_{r1}$; thisis due to the assumption that the initial value $n + \Delta n$ of the dividing ratio is accidentally equal to the dividing ratio corresponding to the radius $r_n$ at the time $t_0$.

In this way, most of the recording operation can be effected as the CAV method. Thus, the positions of recording tracks in which the synchronizing signal is recorded are aligned on the same radius of the recording disc, and the crosstalk phenomenon is eliminated. Furthermore, since the angular velocity of the rotation of disc is gradually decreased by stages between each position of recording tracks in which the recording of signals is effected in accordance with the CAV method, the total density of recording is remarkably increased relative to the conventional CAV disc.

Moreover, in the portion of the recording tracks in which the angular velocity of rotation of the disc is varying, the crosstalk effect is minimized by keeping enough pitch of the recording tracks for avoiding the crosstalk phenomenon.

It will be appreciated from the foregoing, according to the present invention, that the positions for recording the synchronizing signals are radially aligned in most of the recording tracks. Therefore, the effect of the crosstalk component on the reproduced picture is substantially negligible. Furthermore, if the information signal is the horizontal synchronizing signal, the beat disturbance due to the crosstalk component will be limited in the fly-back line of the scanning lines and, therefore, the reproduced video signal is no longer disturbed by the crosstalk component.

Furthermore, since the pitch of the recording tracks is large in the portion where the angular velocity of rotation of the disc is varying, the beat disturbance can be significantly reduced.

This proposition is especially effective for reducing the crosstalk phenomenon corresponding to the vertical blanking period.

Moreover, since the linear velocity of the recording tracks is controlled within a range $v_0(1+\alpha)$ througn $v_0(1-\alpha)$, the density of the recording is improved, especially in the outer recording tracks, and therefore a long recording time is made possible.

Above, a preferred embodiment of the present invention has been described. It should be understood, however, that the foregoing description is for illustrative purposes only, and is not intended to limit the scope of the invention. Rather, there are numerous equivalents to the preferred embodiments, and such are intended to be covered by the appended claims.

As an example, the invention is applicable to a recording system in which the recording is initiated from the outer side of the recording disc, or to a system in which a recording means other than a laser beam is utilized. Furthermore, the invention is applicable to a recording system which is adapted to record information signals other than a video signal as far as the recording track is made as a spiral or a concentrical form. In addition, the method for reducing the angular velocity of rotation is not limited to the CAA operation, which is described in the explanation of the preferred embodiment, and, further, another operation may be used as this method for reducing the angular velocity of the rotation. Moreover, either CAA operation or CAV operation may take place first. Furthermore, modes of operation may be changed one or more desired number of times.

What is claimed is:

1. A method for recording an information signal on a recording disc having a first portion of recording tracks in which said information signal is recorded on said recording disc under a condition that the angular velocity of rotation of the disc is constant, and having a second portion of recording tracks in which said information signal is recorded on said recording disc under a condition that the angular velocity of rotation of said recording disc is varying, the first and second portions of recording tracks being formed alternately so as to be interspersed, the improvement comprising the steps of forming the first portion of the recording tracks with a space between each track having a first constant value, and forming the second portion of the recording tracks with a space between each track having a second constant value that is greater than said first constant value whereby crosstalk between adjacent tracks is avoided.

2. A method as claimed in claim 1, wherein said information signal is a video format signal.

3. A method as claimed in claim 1, wherein said information signal includes a synchronizing signal and said first step includes forming said first portion of recording tracks so that positions of the recording tracks in which said synchronizing signals are recorded are aligned along radial directions of said recording disc.

4. A method as claimed in claim 3, wherein said information signal is a video format signal.

5. A method as claimed in claim 1, wherein said second step includes rotating said disc at a constant angular acceleration.

6. A method as claimed in claim 5, wherein said information signal is a video format signal.

7. A method as claimed in claim 5, wherein said information signal includes a synchronizing signal and said first step includes forming said first portion of recording tracks so that positions of the recording tracks in which said synchronizing signals are recorded are aligned along radial directions of said recording disc.

8. A method as claimed in claim 7, wherein said information signal is a video format signal.

9. A recording disc with recording tracks that have recorded thereon an information signal including a synchronizing signal, said disc comprising:
(a) a first area of circular recording tracks on the recording disc, the information in said first area of recording tracks recorded on said disc while said disc is rotated at a constant angular velocity in which the synchronizing signals of the recording tracks are aligned in a radial direction of the recording disc, the spaces between each of said recording tracks in said first area having a first constant value; and
(b) a second area of circular recording tracks within a on the recording disc, the information in said second area of recording tracks recorded on said disc while said disc is rotated at a changing angular velocity, the spaces between each of said recording tracks in said second area having a second constant value, said second constant value being greater than said first constant value,
(c) wherein said first and second areas are interspersed on the disc and the resulting spacing pattern minimizes crosstalk.

10. A disc as claimed in claim 9 wherein said second area of recording tracks is recorded while said disc is rotated at a constant angular acceleration.

11. A disc as claimed in claim 9 wherein said information signal is a video format signal and said synchronizing signal is a horizontal synchronizing signal.

12. A disc as claimed in claim 9 wherein the linear velocity corresponding with the angular velocity at any point of the recording tracks that are formed in said first area does not exceed a predetermined maximum value.

13. A disc as claimed in claim 12 wherein said linear velocity is within a predetermined range of linear velocities.

14. A disc as claimed in claim 13 wherein the linear velocity corresponding with the angular velocity at any point in said second area of recording tracks is within said predetermined range of linear velocities.

* * * * *